Figure 1:
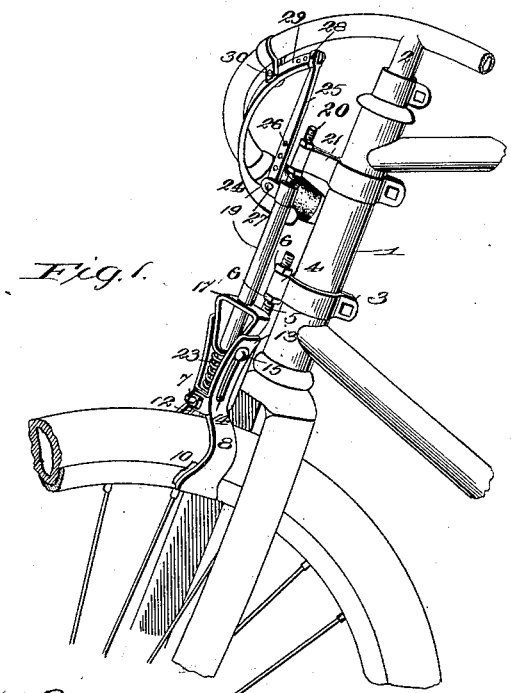

No. 609,647. Patented Aug. 23, 1898.
W. WOLLSHLAEGER.
BICYCLE BRAKE.
(Application filed Dec. 4, 1897.)

(No Model.)

Witnesses
Jos. C. Stack.
Victor J. Evans.

Inventor
William Wollshlaeger.
by V. D. Stockbridge
his Attorney.

THE NORRIS PETERS CO., PHOTO-LITHO., WASHINGTON, D. C.

UNITED STATES PATENT OFFICE.

WILLIAM WOLLSHLAEGER, OF PORT PERRY, PENNSYLVANIA.

BICYCLE-BRAKE.

SPECIFICATION forming part of Letters Patent No. 609,647, dated August 23, 1898.

Application filed December 4, 1897. Serial No. 660,741. (No model.)

*To all whom it may concern:*

Be it known that I, WILLIAM WOLLSHLAEGER, a citizen of the United States, residing at Port Perry, in the county of Allegheny and State of Pennsylvania, have invented certain new and useful Improvements in Bicycle-Brakes; and I do hereby declare the following to be a full, clear, and exact description of the invention, such as will enable others skilled in the art to which it appertains to make and use the same.

This invention relates to bicycle-brakes, and while especially designed for use upon bicycles it will be understood as the description proceeds that the brake is applicable to any foot-propelled vehicle.

The primary object of the invention is to provide a clutch-brake adapted to firmly grip or clutch the rim of one of the machine-wheels, the device for that purpose embodying a pair of shoes adapted to contact with the rim on each side and the said shoes being operated by means of a spreader controlled by a finger-lever arranged on the handle-bar of the machine. These and other objects of the invention will appear in the course of the ensuing description.

The invention consists in an improved brake embodying certain novel features and details of construction and arrangement of parts, as hereinafter fully described, illustrated in the drawings, and incorporated in the claims hereto appended.

Figure 2:
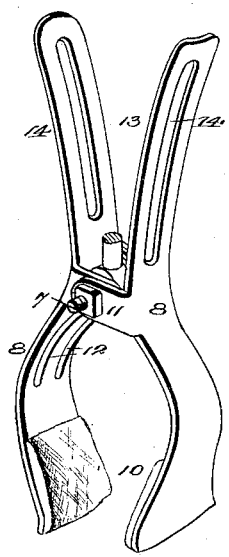
Figure 4:
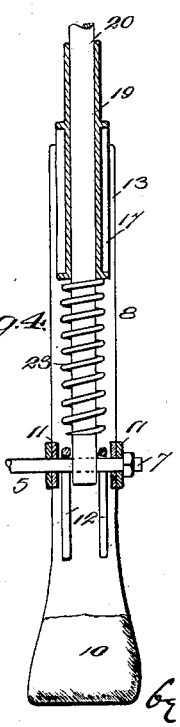
Figure 3:
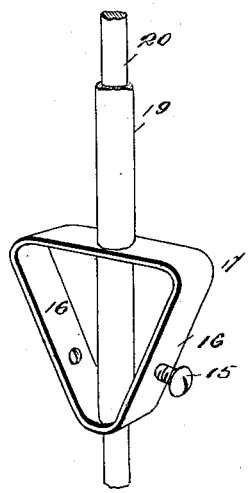

In the accompanying drawings, Figure 1 is a perspective view of a sufficient portion of a bicycle to illustrate the application of the improved brake thereto. Fig. 2 is a detail view of one of the brake-shoes. Fig. 3 is a similar view of the plunger with its spreader. Fig. 4 is a vertical sectional view taken through the shoes and plunger or runner.

Similar numerals of reference designate corresponding parts in all the views.

Referring to the drawings, 1 designates the head-tube of a bicycle, and 2 the handle-bar thereof, the said parts being of the ordinary construction.

In carrying out the present invention I provide a clip or bracket 3, which is secured around the head-tube and provided with an eye 4, through which passes a hanger 5, the upwardly-extending shank of which is screw-threaded to receive nuts 6 at either side of the eye 4, whereby the hanger may be adjusted in height. The lower end of the hanger is extended substantially at right angles to form a pivot 7, and upon this pivot are mounted two shoes 8, the lower ends of which are curved in opposite directions sufficiently to extend around a pneumatic tire, the end portions of the shoes being flattened, so as to bear against the rim of the wheel upon opposite sides.

The shoes may be lined with rubber or other suitable material, as indicated at 10, for increasing the frictional properties thereof and also protecting the rim of the wheel from injury. At a point intermediate their ends the shoes are provided with inwardly-extending ears 11, which overlap each other and are provided with alining openings through which the pivot above referred to passes, the said shoes being thus pivotally mounted upon a common fulcrum. The shoes are also normally spread apart, so as to be free from the tire and rim, by means of one or more springs 12, coiled to extend around the pivot of the hanger and having their terminals extended in opposite directions and bearing against the inner surfaces of the shoes, as clearly shown in the sectional view.

The upper ends of the shoes are provided with upwardly-diverging extensions 13, provided with longitudinal slots 14 to receive headed studs or screws 15, carried by the downwardly-converging side portions 16 of a wedge-shaped spreader 17, carried on the lower end of a tubular runner or plunger 19. The plunger 19 may be of any suitable length and surrounds and slides upon a guide 20 in the form of a rod extending substantially parallel to the head-tube of the machine, the said rod being secured at its upper end to the forwardly-projecting portion of a bracket 21, secured to the head-tube of the machine and secured at its lower end upon the pivot of the hanger. Interposed between the lower end of the runner and the pivot of the hanger is a coil-spring 23, which surrounds the guide-rod and serves to normally uphold and push upwardly the runner or plunger. In the upward movement of the plunger or runner the headed studs bring the slotted extensions of the shoes toward each other, and in the downward movement of the plunger the spreader acts against the slotted extensions of the shoes, so as to force the shoes proper against the rim for effecting a stoppage of the wheel.

The upper end of the runner or plunger is provided with laterally-extending ears 24, between which is pivotally and adjustably received the lower portion of a rod 25, having a series of holes 26 to receive a pin 27, thus providing for the adjustment referred to. At its upper end this rod or bar connects pivotally by means of a pin or bolt 28 with one end of a finger or hand lever 29, extending under the handle-bar and fulcrumed intermediate its ends, as indicated at 30, on the clip or bracket secured to the handle-bar.

From the foregoing description it will be seen that I have provided a simple, compact, and efficient hand-brake for bicycles and similar vehicles, the same being adapted to operate upon opposite sides of the wheel-rim for frictionally grasping said rim when the hand or finger lever is operated. Upon releasing said lever the supporting device is pressed upward by means of the spring referred to, thereby effecting a spreading or separation of the shoes, relieving the same from contact with the rim. By means of the improved brake all injury to the tire is obviated and the braking action is applied only to the rim, which is well adapted to receive the pressure of the brake-shoes and withstand the abrasive effect thereof.

It will of course be understood that the bicycle-brake hereinabove described is susceptible of various changes in the form, proportion, and minor details of construction, which may accordingly be resorted to without departing from the principle or sacrificing any of the advantages of the invention.

Having thus described the invention, what is claimed as new, and desired to be secured by Letters Patent, is—

1. In a brake of the character described, a pair of brake-shoes adapted to embrace one of the wheel-rims and pivotally supported upon a hanger adjustable toward and away from the wheel-rim, upwardly-diverging extensions or arms on said shoes disposed flatwise in opposition to each other and having longitudinal slots, means for normally holding said shoes apart, a spreader moving substantially parallel to the head-tube of the machine, headed studs on said spreader working in the slotted extensions on the shoes, a spring for elevating said spreader from beneath, and a hand-lever for depressing the spreader, substantially as described.

2. In a brake of the character specified, in combination, a pair of oppositely-curved brake-shoes adapted to contact with a wheel-rim, a vertically-adjustable hanger adapted to be secured to the machine-frame and forming a common pivot for said brake-shoes, slotted extensions on said brake-shoes disposed flatwise in parallel relation, a movable runner, a guide-rod for said runner, a hollow wedge-shaped spreader carried by the runner and operating between said slotted extensions, headed studs on the spreader working in the slots of said extensions, a spring for elevating the runner, and a hand-lever for depressing the runner, substantially as described.

3. In a bicycle-brake, the combination with a guide-rod extending along one side of the head-tube, of a bracket connecting the upper end of said rod to the steering-head a tubular runner slidingly mounted thereon, a wedge-shaped spreader on said runner, a vertically-adjustable hanger pivoted brake-shoes thereon for contacting with each side of the rim of one of the wheels and designed to be operated by said spreader, and means for raising and lowering said runner, substantially as described.

In testimony whereof I affix my signature in presence of two witnesses.

WILLIAM WOLLSHLAEGER.

Witnesses:
W. L. MOOK,
W. A. McDEVITT.